United States Patent
Borisov et al.

(10) Patent No.: US 10,354,520 B2
(45) Date of Patent: Jul. 16, 2019

(54) POWER LINE COMMUNICATION OVER DISCONNECTED SERVICE LINES

(71) Applicant: Itron, Inc., Liberty Lake, WA (US)

(72) Inventors: Vladimir Borisov, Seneca, SC (US); Sudhir Prakash Emmanuel Thumaty, Anderson, SC (US)

(73) Assignee: Itron, Inc., Liberty Lake, WA (US)

( * ) Notice: Subject to any disclaimer, the term of this patent is extended or adjusted under 35 U.S.C. 154(b) by 630 days.

(21) Appl. No.: 13/717,283

(22) Filed: Dec. 17, 2012

(65) Prior Publication Data

US 2014/0172723 A1    Jun. 19, 2014

(51) Int. Cl.
  *G06Q 20/38*  (2012.01)
  *H04B 3/54*  (2006.01)
  *G08C 19/00*  (2006.01)
  *G06Q 50/06*  (2012.01)
  *H04L 12/64*  (2006.01)

(52) U.S. Cl.
  CPC ......... *G08C 19/00* (2013.01); *G06Q 20/3821* (2013.01); *G06Q 50/06* (2013.01); *H04B 3/54* (2013.01); *H04B 3/546* (2013.01); *H04L 12/6418* (2013.01); *H04B 2203/5433* (2013.01);
  (Continued)

(58) Field of Classification Search
  CPC .... G08C 19/00; G06Q 20/3821; G06Q 50/06; H04B 3/54; H04B 3/546; H04B 2203/5466; H04B 2203/5458; H04B 2203/5433; H04B 1/10; H04B 1/48; H04B 1/123; H02J 13/0082; H04L 12/2834; G06F 1/26; G06F 1/28; G06F 7/588; H01H 61/02; H01H 9/32; H03K 19/0005;
  (Continued)

(56) References Cited

U.S. PATENT DOCUMENTS 3,742,454 A * 6/1973 Baker, Jr. .............. G01F 15/063
                                                340/13.37
4,359,414 A * 11/1982 Mastrangelo .......... H01C 7/005
                                                252/511
(Continued)

FOREIGN PATENT DOCUMENTS

WO    WO2006047539 A2    5/2006

OTHER PUBLICATIONS

PCT Search Report and Written Opinion dated Jan. 31, 2014 for PCT application No. PCT/US13/67850, 9 pages.
(Continued)

*Primary Examiner* — Steven S Kim
*Assistant Examiner* — Johann Y Choo
(74) *Attorney, Agent, or Firm* — Lee & Hayes, P.C.

(57) ABSTRACT

A network communication device, such as an electricity meter, is configured to communicate with devices on a circuit internal to a site via power line communication (PLC), even when electricity service to the site is disconnected. The network communication device is configured to monitor one or more circuits internal to the site and to receive power line communications from the device(s) coupled to the circuit internal to the site when the site is disconnected from electricity service. A PLC module of the network communication device may include a switch-based or capacitor-based monitor that maintains a PLC coupler electrically connected with the circuit internal to the site even when electricity service to the site is disconnected.

18 Claims, 5 Drawing Sheets

(52) U.S. Cl.
CPC ............... *H04B 2203/5458* (2013.01); *H04B 2203/5466* (2013.01)

(58) Field of Classification Search
CPC ....... H03K 19/0013; H03K 19/018521; H03K 3/356121
USPC .......... 340/870.02, 10, 870; 705/39, 63, 76; 700/245
See application file for complete search history.

(56) References Cited

U.S. PATENT DOCUMENTS

| | | | | |
|---|---|---|---|---|
| 4,686,382 | A * | 8/1987 | Shuey | H04B 3/56 307/104 |
| 4,996,517 | A * | 2/1991 | Kringen et al. | 340/506 |
| 5,257,007 | A * | 10/1993 | Steil et al. | 340/539.3 |
| 5,568,121 | A * | 10/1996 | Lamensdorf | G08B 25/016 340/502 |
| 5,572,438 | A * | 11/1996 | Ehlers et al. | 700/295 |
| 5,600,307 | A * | 2/1997 | Aslan | 340/600 |
| 5,655,561 | A * | 8/1997 | Wendel et al. | 137/79 |
| 5,699,276 | A | 12/1997 | Roos | |
| 5,715,390 | A * | 2/1998 | Hoffman et al. | 726/20 |
| 5,767,790 | A * | 6/1998 | Jovellana | 340/870.02 |
| 5,963,650 | A * | 10/1999 | Simionescu et al. | 705/63 |
| 6,121,885 | A * | 9/2000 | Masone et al. | 340/628 |
| 6,240,167 | B1 * | 5/2001 | Michaels | 379/106.03 |
| 6,538,577 | B1 * | 3/2003 | Ehrke et al. | 340/870.02 |
| 6,647,024 | B1 * | 11/2003 | Dombkowski | H04L 12/6418 370/352 |
| 7,098,783 | B2 * | 8/2006 | Crichlow | 340/531 |
| 7,135,850 | B2 * | 11/2006 | Ramirez | H02J 3/14 324/142 |
| 7,412,304 | B2 * | 8/2008 | Uenou | 700/295 |
| 8,825,553 | B2 * | 9/2014 | Jhang et al. | 705/63 |
| 2001/0030580 | A1 * | 10/2001 | Canyon | H03F 1/0211 330/285 |
| 2001/0038343 | A1 * | 11/2001 | Meyer et al. | 340/870.02 |
| 2002/0080938 | A1 * | 6/2002 | Alexander, III | H04L 41/22 379/106.01 |
| 2003/0158677 | A1 * | 8/2003 | Swarztrauber et al. | 702/62 |
| 2003/0172136 | A1 * | 9/2003 | Katagawa et al. | 709/220 |
| 2006/0108417 | A1 * | 5/2006 | Simon et al. | 235/382 |
| 2006/0126647 | A1 | 6/2006 | Hicks, III | |
| 2007/0040672 | A1 * | 2/2007 | Chinigo | 340/539.22 |
| 2007/0096891 | A1 * | 5/2007 | Sheriff et al. | 340/457.1 |
| 2008/0129538 | A1 * | 6/2008 | Vaswani | G01D 4/002 340/870.03 |
| 2008/0272654 | A1 * | 11/2008 | Lontka | 307/65 |
| 2010/0007354 | A1 * | 1/2010 | Deaver et al. | 324/539 |
| 2010/0073172 | A1 * | 3/2010 | Lax | 340/578 |
| 2010/0076835 | A1 * | 3/2010 | Silverman | 705/14.33 |
| 2010/0250440 | A1 * | 9/2010 | Wang et al. | 705/63 |
| 2011/0022239 | A1 * | 1/2011 | Forbes et al. | 700/286 |
| 2011/0061014 | A1 * | 3/2011 | Frader-Thompson | G01D 4/002 715/771 |
| 2011/0063126 | A1 * | 3/2011 | Kennedy et al. | 340/870.02 |
| 2011/0309929 | A1 * | 12/2011 | Myers | 340/539.11 |
| 2012/0105249 | A1 * | 5/2012 | Bauerfeld et al. | 340/870.02 |
| 2012/0260194 | A1 * | 10/2012 | Kennedy et al. | 715/752 |
| 2012/0326836 | A1 * | 12/2012 | Sewell et al. | 340/4.34 |
| 2013/0035992 | A1 * | 2/2013 | Silverman | 705/14.1 |
| 2013/0123998 | A1 * | 5/2013 | King | G06F 1/30 700/292 |
| 2014/0285154 | A1 * | 9/2014 | Mohagheghi | H02J 3/006 320/127 |

OTHER PUBLICATIONS

European Office Action dated Dec. 7, 2018 for European Patent Application No. 13795047.3, a counterpart of U.S. Appl. No. 13/717,283, 6 pages.

* cited by examiner

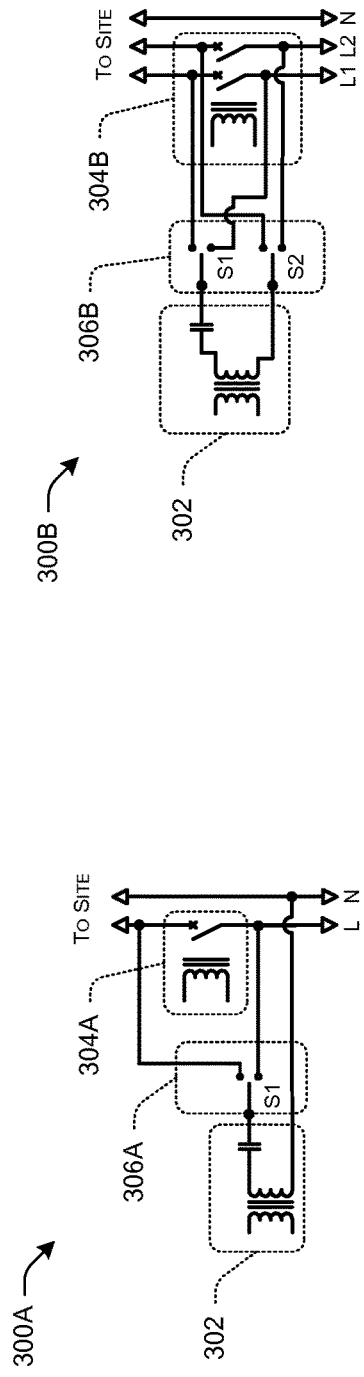
FIG. 3A
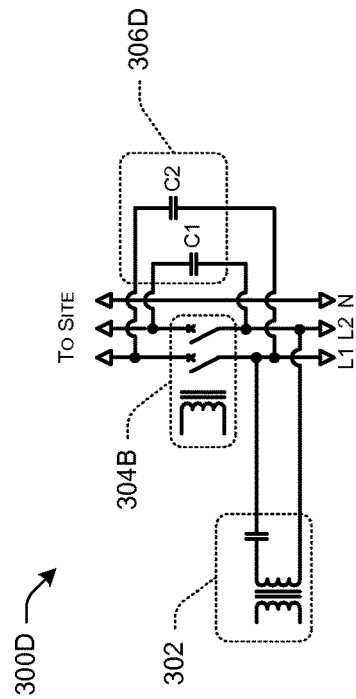
FIG. 3B
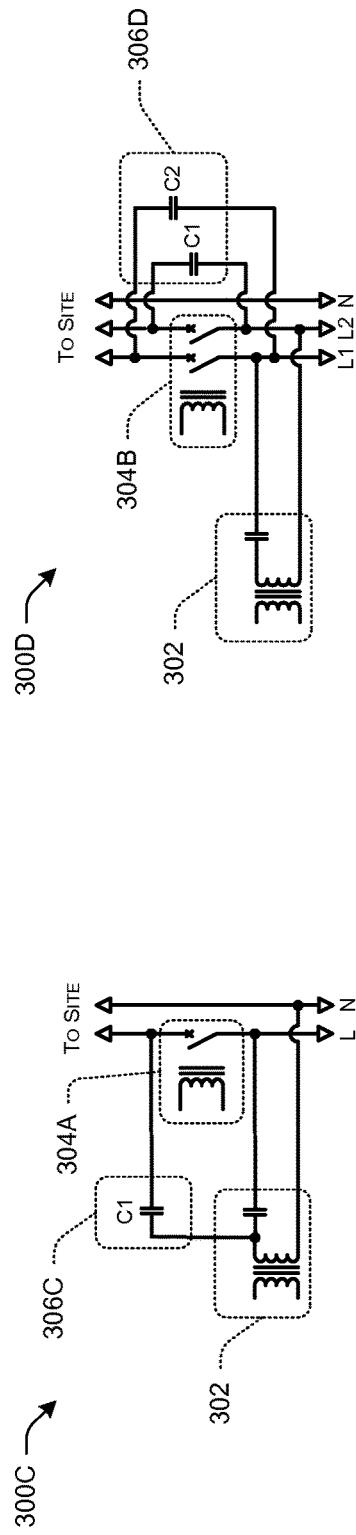
FIG. 3C
FIG. 3D

POWER LINE COMMUNICATION OVER DISCONNECTED SERVICE LINES

BACKGROUND

Electricity meters provide a mechanism for utility companies to measure electricity consumption at a residence, business, facility, or other site. Such electricity meters often contain a service switch to connect or disconnect electricity service to the respective site. Some electricity meters are equipped with two-way communication technologies that allow utility companies to remotely connect or disconnect power via the service switch in the meter.

Some electricity meters also include communication technologies, such as power line communications (PLC), that allow the meters to communicate with one or more appliances or communication devices inside the consumer's home or other site to which service is provided (i.e., on a circuit internal to the site). However, the utility company's ability to communicate with appliances or communication devices on circuits internal to the site via PLC terminates if electricity service to the site is disconnected. That is, once service is disconnected to the site, the service switch is open, thereby preventing a PLC coupler at the meter from communicating with devices on circuits internal to the site.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items.

FIG. 3A is a schematic diagram showing details of an example circuit of a network communication device, such as the network communication device of FIG. 2, that uses a switch-based solution to facilitate PLC communication with devices on a circuit internal to a site via PLC even when electricity service to the site is disconnected. FIG. 3A is an example of a circuit usable with single phase electricity service.

FIG. 3B is a schematic diagram showing details of an example circuit of a network communication device, such as the network communication device of FIG. 2, that uses a switch-based solution to facilitate PLC communication with devices on a circuit internal to a site via PLC even when electricity service to the site is disconnected. FIG. 3B is an example of a circuit usable with multi-phase electricity service.

FIG. 3C is a schematic diagram showing details of an example circuit of a network communication device, such as the network communication device of FIG. 2, that uses a capacitor-based solution to facilitate PLC communication with devices on a circuit internal to a site via PLC even when electricity service to the site is disconnected. FIG. 3C is an example of a circuit usable with single phase electricity service.

FIG. 3D is a schematic diagram showing details of an example circuit of a network communication device, such as the network communication device of FIG. 2, that uses a capacitor-based solution to facilitate PLC communication with devices on a circuit internal to a site via PLC even when electricity service to the site is disconnected. FIG. 3D is an example of a circuit usable with multi-phase electricity service.

DETAILED DESCRIPTION

Overview

Figure 1:
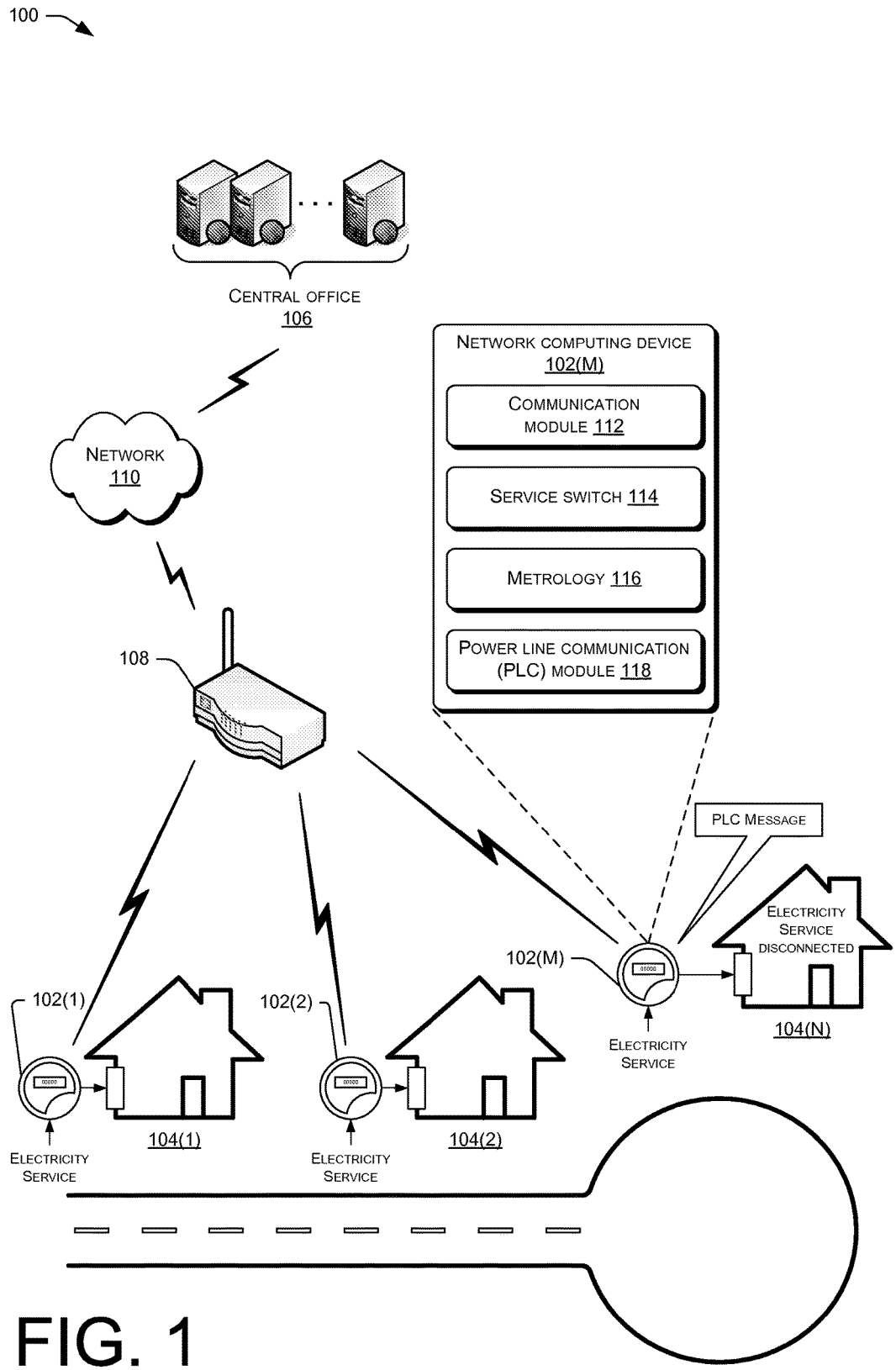
FIG. 1 is a schematic diagram of an example architecture in which one or more electricity meters or other network communication devices are configured to communicate with devices on a circuit internal to a site via power line communication (PLC) even when electricity service to the site is disconnected.

As discussed above, some electricity meters include communication technologies, such as power line communications (PLC), that allow the meters to communicate with one or more appliances or communication devices inside the consumer's home or other site to which service is provided (i.e., on a circuit internal to the site). However, previously the utility company's ability to communicate with appliances or communication devices on circuits internal to the site via PLC terminated if electricity service to the site is disconnected.

This application describes techniques that facilitate communication with devices on a circuit internal to a site via PLC even when electricity service to the site is disconnected. For instance, the techniques allow an electricity meter or other network communication device to monitor one or more circuits internal to the site and to receive power line communications from the device(s) coupled to the circuit internal to the site when the site is disconnected from electricity service. A PLC module of the network communication device (e.g., electricity meter) includes a monitor that maintains a PLC coupler electrically connected with the circuit internal to the site even when electricity service to the site is disconnected. In one example, the monitor may include one or more switches that reconnect the PLC coupler to the circuit internal to the site when the service switch is opened (i.e., when electricity service is disconnected from the site). In another example, the monitor may include one or more capacitors interposed between the PLC coupler and the circuit internal to the site. When the service switch is open (i.e., electrical service is disconnected), the monitor can measure the leakage current through the capacitor(s) to receive PLC communications.

The ability of the PLC module of the network communication device to remain electrically connected with the circuit internal to the site even when electricity service to the site is disconnected allows for functionality that was not previously possible. This connectivity allows the network communication device to receive messages from appliances or other devices coupled to the circuit internal to the site when electricity service is disconnected. For example, this connectively makes it possible for an onsite terminal (e.g., in-home display) or other appliance at the site to request that electricity service be connected to the site. The onsite terminal may enable a user to input a payment credential (e.g., identifier of a pre-paid unit of electricity, bank account, credit card number, etc.) to request that electricity service be connected/reconnected to the site. As another example, this connectively makes it possible for the network communication device to receive notifications about potentially hazardous conditions at the site, such as an alarm from a smoke detector, security system, moisture detector, carbon monoxide detector, seismic detector, temperature sensor, radon detector, or the like. In yet another example, this connectively makes it possible for the network communication device to receive notifications about conditions or status of devices coupled to the circuit internal to the site (e.g., a low battery notification). These and other scenarios are made possible by the fact that the network communication device is able to remain electrically connected with the circuit internal to the site even when electricity service to the site is disconnected.

Multiple and varied example implementations and embodiments are described below. However, these examples are merely illustrative, and other implementations and embodiments may be used to implement PLC communication with devices on a circuit internal to a site when electricity service to the site is disconnected without departing from the scope of the claims.

Example Architecture

FIG. 1 is a schematic diagram of an example architecture 100 in which one or more electricity meters or other network communication devices are configured to communicate with devices on a circuit internal to a site via power line communication (PLC) even when electricity service to the site is disconnected. The architecture 100 includes a plurality of network communication devices 102(1), 102(2), ... 102(M) (collectively referred to as network communication devices 102) associated with a plurality of sites 104(1), 104(2), ... 104(N) (collectively referred to as sites 104). In this example, M represents a number of network communication devices in a utility communication network, and may be any integer greater than 0. N represents a number of individual sites serviced by network communication devices 102 in the utility communication network, and may be any integer greater than 0. The number of network communication devices M may or may not be equal to the number of sites N since some sites may include multiple network communication devices 102 and/or some network communication devices may serve multiple sites 104. The utility communication network may include one or a combination of a wide area network (WAN), metropolitan area network (MAN), local area network (LAN), neighborhood area network (NAN), home area network (HAN), personal area network (PAN), or the like.

The network communication devices 102 are described herein as electricity meters. However, network communication devices 102 may be configured as, or in connection with, a variety of other computing devices such as, for example, smart utility meters (e.g., electric, gas, and/or water meters), sensors (e.g., temperature sensors, weather stations, frequency sensors, etc.), control devices, transformers, switches, combinations of the foregoing, or the like. The architecture 100 may represent a heterogeneous network of network communication devices, in that the network communication devices 102 may include different types of network communication devices (e.g., smart meters, cellular relays, sensors, etc.), different generations or models of network communication devices, and/or network communication devices that otherwise are capable of transmitting on different channels and using different modulation techniques, data rates, protocols, signal strengths, and/or power levels.

In this example, the network communication devices 102 are also configured to communicate with a central office 106 via an edge device 108 (e.g., data collector, cellular relay, cellular router, edge router, DODAG root, etc.) which serves as a connection point to a backhaul network(s) 110, such as the Internet. The utility communication network may be configured as a "star network" in which the network communication devices 102 communicate directly with a data collector (as shown), or as a "mesh network" in which the network communication devices 102 communicate with an edge device directly or via one or more intervening upstream devices. The architecture of FIG. 1 is generically representative of either a star network or a mesh network.

The network communication device 102(M) is representative of each of the network communication devices 102 and includes a communication module 112 usable to communicate with the edge device 108 and/or one or more other network communication devices 102. The communication module 112 may include hardware and/or software components to enable one or multiple different modes of communication. For instance, the communication module 112 may comprise a radio frequency (RF) transceiver configured to transmit and/or receive RF signals via one or more of a plurality of channels/frequencies. The transceiver may comprise an RF front end and a baseband processor or software defined radio. In some implementations, each of the network communication devices 102 includes a single radio configured to send and receive data on multiple different channels, such as the control channel and multiple data channels of each communication link. The transceiver may also be configured to implement a plurality of different modulation techniques, data rates, protocols, signal strengths, and/or power levels. Additionally or alternatively, the communication module 112 may include a cellular or wide area network (WAN) module, or other communication software and/or hardware to facilitate communication with other devices in the utility communication network.

The network communication device 102(M) also includes a service switch 114 usable to connect, disconnect, and/or reconnect service to a residence, business, or other site 104. In other implementations the service switch 114 may be a separate device or module communicatively coupled to the network communication device 102. In the case of an electricity meter or other device including metering functionality, the network communication device 102 may also include metrology 116 to sense and measure electricity consumption at the site. The metrology 116 is representative of any of a variety of hardware and/or software usable to sense and measure electricity consumption data of the site. The network communication device 102(M) also includes a power line communication (PLC) module 118 usable by the network communication device 102(M) to communicate via PLC. The PLC module 118 may be configured for communication with other devices (e.g., 102 and/or 108) in the utility communication network. The PLC module 118 may additionally or alternatively be configured for communication with devices (e.g., appliances) coupled to a circuit internal to a site 104(N) at which the network communication device 102(M) is installed.

In the illustrated example, electricity service is provided to network communication device 102(M), but the electricity service to the site 104(N) is disconnected by the service switch 114 of the network communication device 102(M). Nevertheless, the PLC module 118 receives a PLC message from a device (not shown in this figure) coupled to a circuit internal to a site 104(N). As mentioned above, the message may comprise a request to connect electricity service to the site, an alert of a potentially unsafe condition at the site, a status notification, or the like. Based on the message, the network communication device 102(M) may perform some action (e.g., connect electricity service to the site, relay the alert, etc.).

Example Network Communication Device

Figure 2:
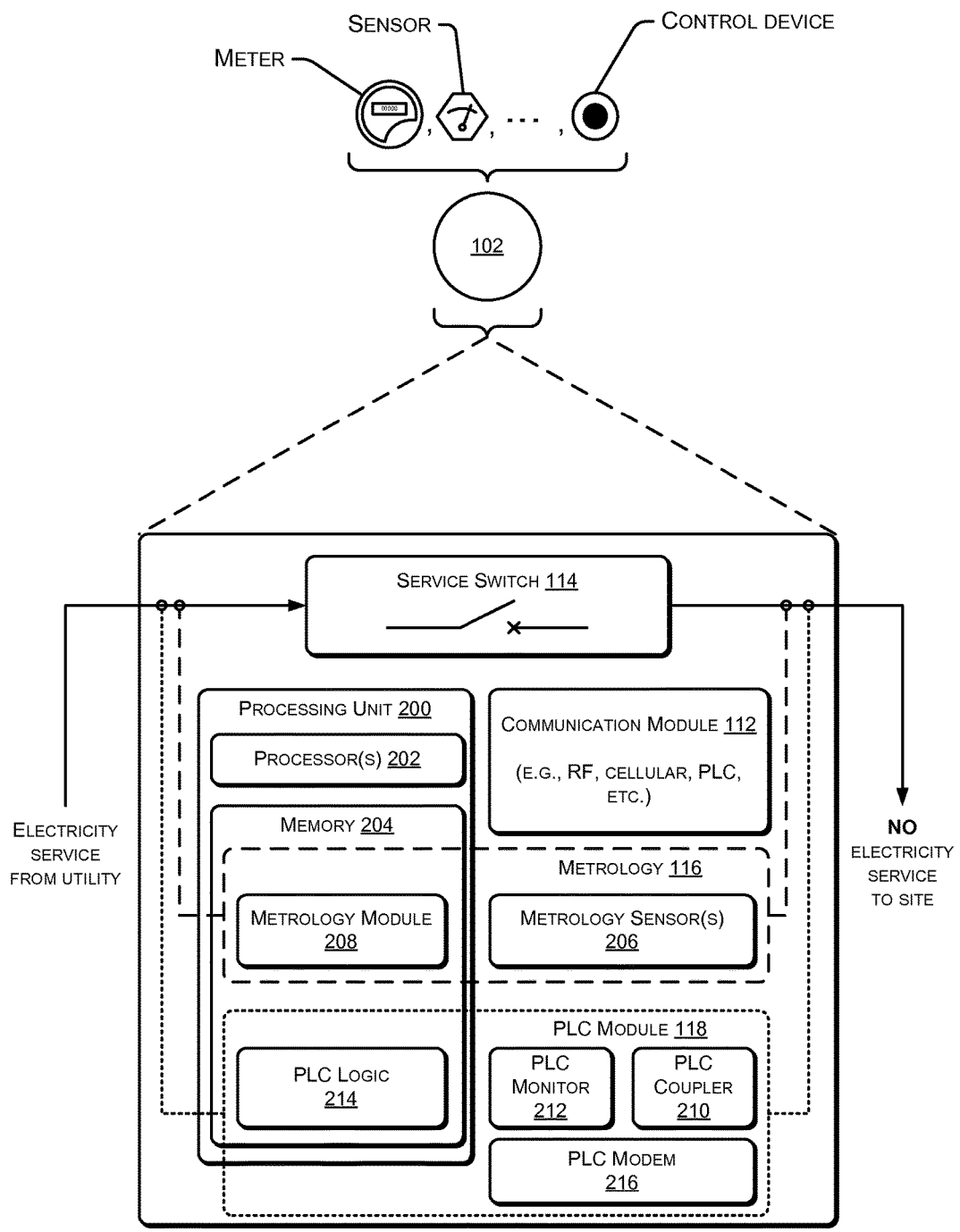
FIG. 2 is a schematic diagram showing details of an example network communication device, such as an electricity meter, that is configured to communicate with devices on a circuit internal to a site via PLC even when electricity service to the site is disconnected.

FIG. 2 illustrates additional details of an example network communication device 102, such as the network communication device 102(M) of FIG. 1. As shown in this figure, the network communication device 102 of this example includes a processing unit 200 comprising one or more processors 202 communicatively coupled to memory 204. The processor(s) 202 in this example are representative of one or more microprocessors, microcontrollers, or other processing devices configured to execute software and/or firmware modules stored in the memory 204. The memory 204 and all other references to "memory" herein are examples of computer-readable media and may take the form of volatile memory, such as random access memory (RAM) and/or non-volatile memory, such as read only memory (ROM) or flash RAM. Computer-readable media includes volatile and non-volatile, removable and non-removable media implemented in any method or technology for storage of information such as computer-readable instructions, data structures, program modules, or other data for execution by one or more processors of a computing device. Examples of computer-readable media include, but are not limited to, phase change memory (PRAM), static random-access memory (SRAM), dynamic random-access memory (DRAM), other types of random access memory (RAM), read-only memory (ROM), electrically erasable programmable read-only memory (EEPROM), flash memory or other memory technology, compact disk read-only memory (CD-ROM), digital versatile disks (DVD) or other optical storage, magnetic cassettes, magnetic tape, magnetic disk storage or other magnetic storage devices, or any other non-transmission medium that can be used to store information for access by a computing device. As defined herein, computer-readable media does not include communication media, such as modulated data signals and carrier waves.

The memory 204 may be configured to store one or more software and/or firmware modules, which are executable on the processor(s) 202 to implement various functions. The metrology 116 of network communication device 102 may include one or more metrology sensors 206 (e.g., hall sensors, shunts, etc.) and associated integrated circuits to process and condition the sensed electricity consumption data for transmission to a metrology module 208, which is stored in memory 204 and executable by the processor(s) 202. The metrology module 208 may include one or more libraries or data stores for storage of metrology data. The subcomponents of the metrology 116 are shown in this figure bounded by a dashed line. As shown in FIG. 2, the metrology 116 is connected across the service switch 114, such that the metrology 116 is able to measure electricity consumption when the service switch 114 is closed.

PLC module 118 includes a PLC coupler 210 to connect the PLC module 118 to the electricity lines for communication, and a PLC monitor 212 configured to maintain the PLC module 118 in communication with a circuit internal to a site even when electricity service to the site is disconnected (i.e., even when the service switch 114 is open). The PLC module 118 also includes PLC logic 214 stored in the memory 204 and executable by the processor(s) 202 to interpret communications received by a PLC modem 216 and send outgoing communications via the PLC modem 216. The PLC modem 216 acts at the direction of the PLC logic 214 to send and receive PLC communications over the circuit internal to the site and/or over electricity service lines (i.e., low, medium, and/or high-voltage power lines) of the utility distribution network. The subcomponents of the PLC module 118 are shown in this figure bounded by a dotted line.

While not shown in this figure, the communication module 112 may include one or more software or firmware components (e.g., software defined radio, drivers, libraries, applications, plugins, etc.) stored in memory 204 and executable or accessible by the processor(s) 202. Additionally, in some embodiments the communication module 112 may include one or more of its own dedicated processor(s) and/or memory.

While certain functions and modules are described herein as being implemented by software and/or firmware executable on a processor, in other embodiments, any or all of the modules may be implemented in whole or in part by hardware (e.g., as an ASIC, a specialized processing unit, etc.) to execute the described functions.

Example PLC Modules

FIGS. 3A-3D illustrate additional details of example PLC modules, such as the PLC module 118 of FIGS. 1 and 2. In particular, FIG. 3A is a schematic diagram showing details of an example circuit 300A of a network communication device, such as the network communication device 102(M), that uses a switch-based solution to facilitate PLC communication with devices on a circuit internal to a site via PLC even when electricity service to the site is disconnected. The circuit 300A is an example of a circuit usable with single phase electricity service. The circuit 300A includes a PLC coupler 302 comprising a high frequency transformer and a high voltage capacitor. The PLC coupler 302 connects the PLC module to the electricity lines of one or more circuits internal to the site. The circuit 300A includes a service switch 304A to connect or disconnect electricity service to the site. Since this example relates to single phase electricity service, the service switch 304A in this example includes a switch on a single line voltage L.

The circuit 300A also includes a PLC monitor 306A configured to maintain the PLC module 118 in communication with a circuit internal to a site even when electricity service to the site is disconnected (i.e., even when the service switch 114 is open). The PLC monitor 306A in this example comprises a single pole, double throw (SPDT) switch S1. When the remote disconnect switch 304A is closed, the switch S1 is in a first position (down in FIG. 3A), in which the PLC coupler 302 is connected to the line voltage L upstream of the disconnect switch 304A. When the service switch 304A is opened to disconnect electricity service to the site, the switch S1 is moved to the second position (up on FIG. 3A), in which the PLC coupler is connected to the downstream side of the service switch 304A (the side closest to the site), to maintain an electrical connection of the PLC coupler 302 with the circuit(s) internal to the site. Thus, even when the service switch 304A is open, the PLC coupler 302 will maintain electrical connection with, and therefore the ability to communication with, devices coupled to the circuit(s) internal to the site.

FIG. 3B is a schematic diagram showing details of another example circuit 300B of a network communication device, such as the network communication device 102(M), that uses a switch-based solution to facilitate PLC communication with devices on a circuit internal to a site via PLC even when electricity service to the site is disconnected. The circuit 300B is an example of a circuit usable with multi-phase electricity service. The circuit 300B is similar to the example of FIG. 3A, except that the service switch 304B in this example includes two switches to disconnect two different phases of line voltage L1 and L2, and the monitor 306B in this example includes two switches, S1 and S2, coupled to the two phases of line voltage L1 and L2, respectively.

FIG. 3C is a schematic diagram showing details of an example circuit 300C of a network communication device, such as the network communication device 102M, that uses a capacitor-based solution to facilitate PLC communication with devices on a circuit internal to a site via PLC even when electricity service to the site is disconnected. The circuit 300C is an example of a circuit usable with single phase electricity service. The circuit 300C is similar to the example of FIG. 3A, except that instead of a switch, the monitor 306C in this embodiment includes a leakage capacitor C1 connected between the PLC coupler 302 and the downstream side (side closest to the site) of the service switch 304A. As the leakage capacitor C1 receives signals from devices coupled to the circuit internal to the site, a very small current flow will "leak" across the dielectric due to influence of electric fields built up by the charge on the plates of the capacitor C1. This leakage current is picked up by the PLC coupler 302 and can be recognized as a PLC message from the one or more devices on the circuit internal to the site.

FIG. 3D is a schematic diagram showing details of yet another example circuit 300D of a network communication device, such as the network communication device 102(M), that uses a capacitor-based solution to facilitate PLC communication with devices on a circuit internal to a site via PLC even when electricity service to the site is disconnected. The circuit 300D is an example of a circuit usable with multi-phase electricity service. Circuit 300D is similar to the example of FIG. 3B, except that instead of switches S1 and S2, the monitor 306D in this example includes a pair of leakage capacitors C1 and C2. The first leakage capacitor C1 is coupled across (i.e., connected to the input and output of) the service switch 304B on line voltage L1, and the second leakage capacitor C2 is coupled across (i.e., connected to the input and output of) the service switch 304B in line voltage L2. Thus, PLC messages from devices on the circuit internal to the site will leak across capacitors C1 and C2 and be picked up by the PLC coupler 302 as a PLC message.

The circuits described in FIGS. 3A-3D are merely examples, and numerous other circuit configurations are possible to implement the circuit monitoring functionality described herein. More specifically, the components of PLC coupler 302 and service switches 304A and 304B are merely illustrative of example implementations of the PLC coupler 210 and service switch 114 of FIG. 2. Likewise, the monitors 306A, 306B, 306C, and 306D are illustrative examples of circuit elements that could be used to implement the monitor 212 of PLC module 118 shown in FIG. 2. Other circuit elements could be used to implement any or all of the elements of the PLC module 118 and/or the service switch 114.

Example Circuit Internal to Site

Figure 4:
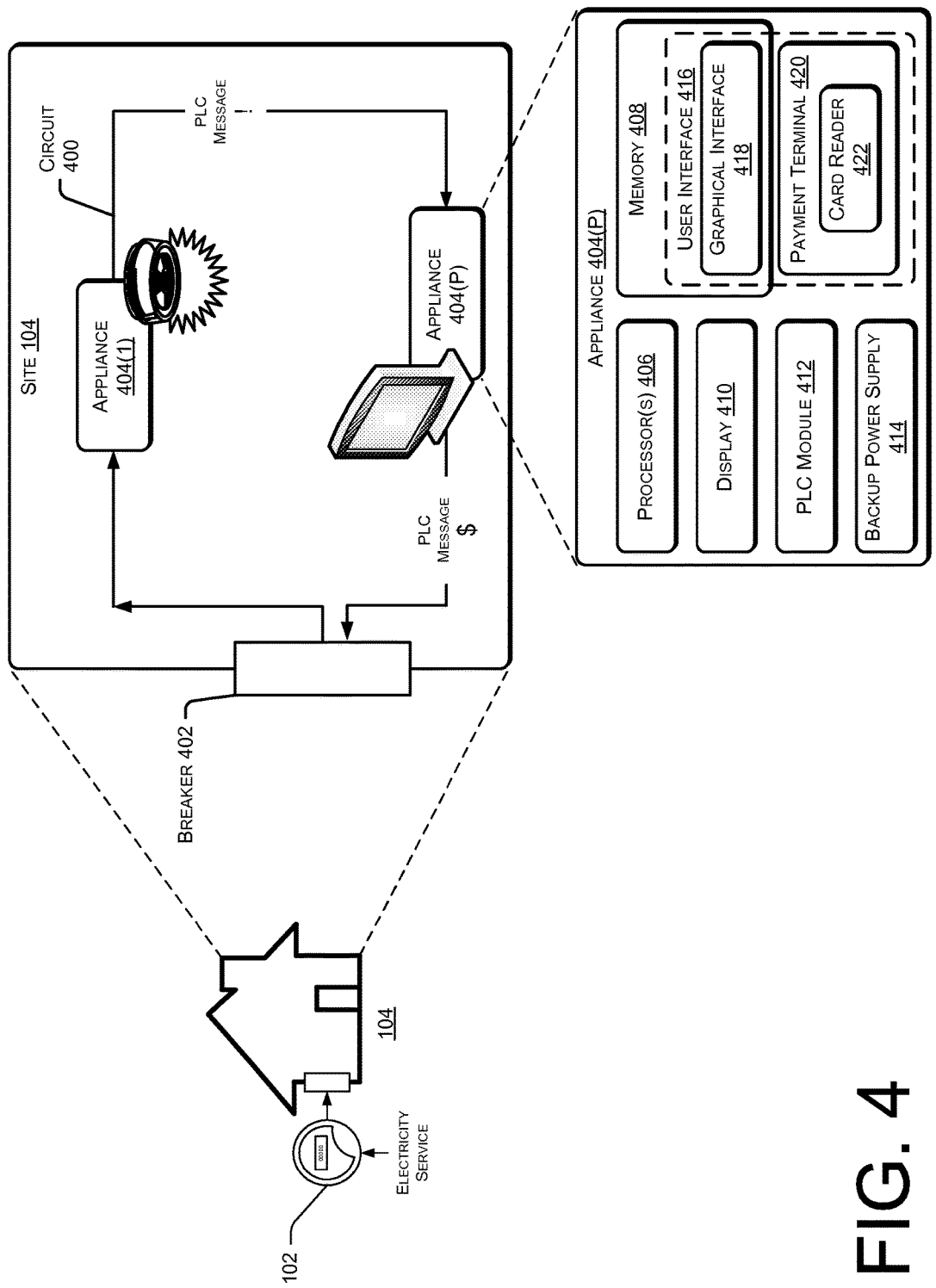
FIG. 4 is a schematic diagram showing details of an example circuit internal to a site, including one or more appliances configured to communicate with a network communication device, such as a meter, via PLC even when electricity service to the site is disconnected.

FIG. 4 illustrates an example circuit 400 internal to a site, such as site 104. In the illustrated example, the circuit 400 is coupled to a network communication device 102 installed at the site 104 via a breaker 402. The circuit 400 may be representative of the entirety of the wiring within the site, or one of multiple circuits within the site. In the illustrated example, multiple appliances 404(1)...404(P) (collectively referred to as appliances 404) are coupled to the circuit 400. The appliances are representative of any device that may be plugged in, wired in, or otherwise coupled to the circuit 400. In the illustrated example, a first appliance comprises a smoke alarm 404(1) that is wired into the circuit 400, but also has a battery backup to provide power in the event of an electricity outage. The smoke alarm 404(1) is configured to send a PLC alarm message via the circuit 400 to the network communication device 102. The network communication device 102 may then decide what to do with the received PLC alarm message based on one or more predetermined routing algorithms of the PLC logic 214, based on instructions in the PLC alarm message itself, or based on one or more other criteria. In some instances, the network communication device 102 may determine to relay the PLC alarm message using communication module 112 to the central office 106 and/or one or more other devices on the utility communication network.

A second appliance in FIG. 4 comprises an onsite terminal 404(P), such as an in-home display. The onsite terminal 404(P) may be a part or hub of a home area network (HAN). The onsite terminal 404(P) in this example includes one or more processors 406 communicatively coupled to memory 408, a display 410, a PLC module 412, a backup power supply 414, and a user interface 416. The processor(s) 406 in this example are representative of one or more microprocessors, microcontrollers, or other processing devices configured to execute software and/or firmware modules stored in the memory 408. The display 410 may comprise any suitable display such as, for example, a liquid crystal display, light emitting diode display, cathode ray tube display, e-ink display, a touch screen display, or the like. The PLC module 412 is configured to allow the onsite terminal 404(P) to communicate with the network communication device 102 and other devices on circuit 400 using PLC communications. The PLC module 412 may include components analogous to the components of PLC module 118 other than the PLC monitor 212. The backup power supply 414 comprises one or more batteries, capacitors, a fuel cell, or other backup power supplies to supply power when main electricity service to the site 104 is disconnected. While the backup power supply 414 is shown as being part of the onsite terminal 404(P), in other embodiments, a backup power supply separate from the onsite terminal 404(P) may additionally or alternatively be provided (e.g., a generator, a fuel cell, solar panels, wind generation, etc.).

The user interface 416 may comprise both a graphical interface 418 portion and a physical interface portion, such as a keypad, touch pad, touch screen, and/or a payment terminal 420. In the illustrated example, the physical portion of the user interface 416 includes a payment terminal 420 having a card reader 422 for reading credit cards, radio frequency identification (RFID) cards, bar codes, quick response (QR) codes, or the like. In other examples, however, the payment terminal may be configured as a user interface screen of the graphical interface on which a user can enter a payment credential. As used herein, a payment credential may be any document, item, number, symbol, or other identifier associated with a mode of payment. Examples of payment credentials include an identifier associated with a prepaid unit of electricity, an identifier associated with a payment instrument (e.g., credit card, credit card number, bank account number, check, etc.), or an identifier associated with a customer account (user ID, password, etc.).

By virtue of having a payment terminal 420, the onsite terminal 404(P) allows a user to input a form of payment and request that electricity (or other utility resource) service be connected to the site 104. The onsite terminal 404(P), powered by backup power supply 414 (or another backup power supply at the site), then sends a PLC message to the network communication device 102 over circuit 400 including a request to connect electricity service to the site. In some embodiments, the PLC message may include a payment credential showing that the customer has paid or agrees to pay for the electricity service to be reconnected. Additional details of such a payment scenario are described with reference to FIG. 5 below.

Example Method of PLC Communication

Figure 5:
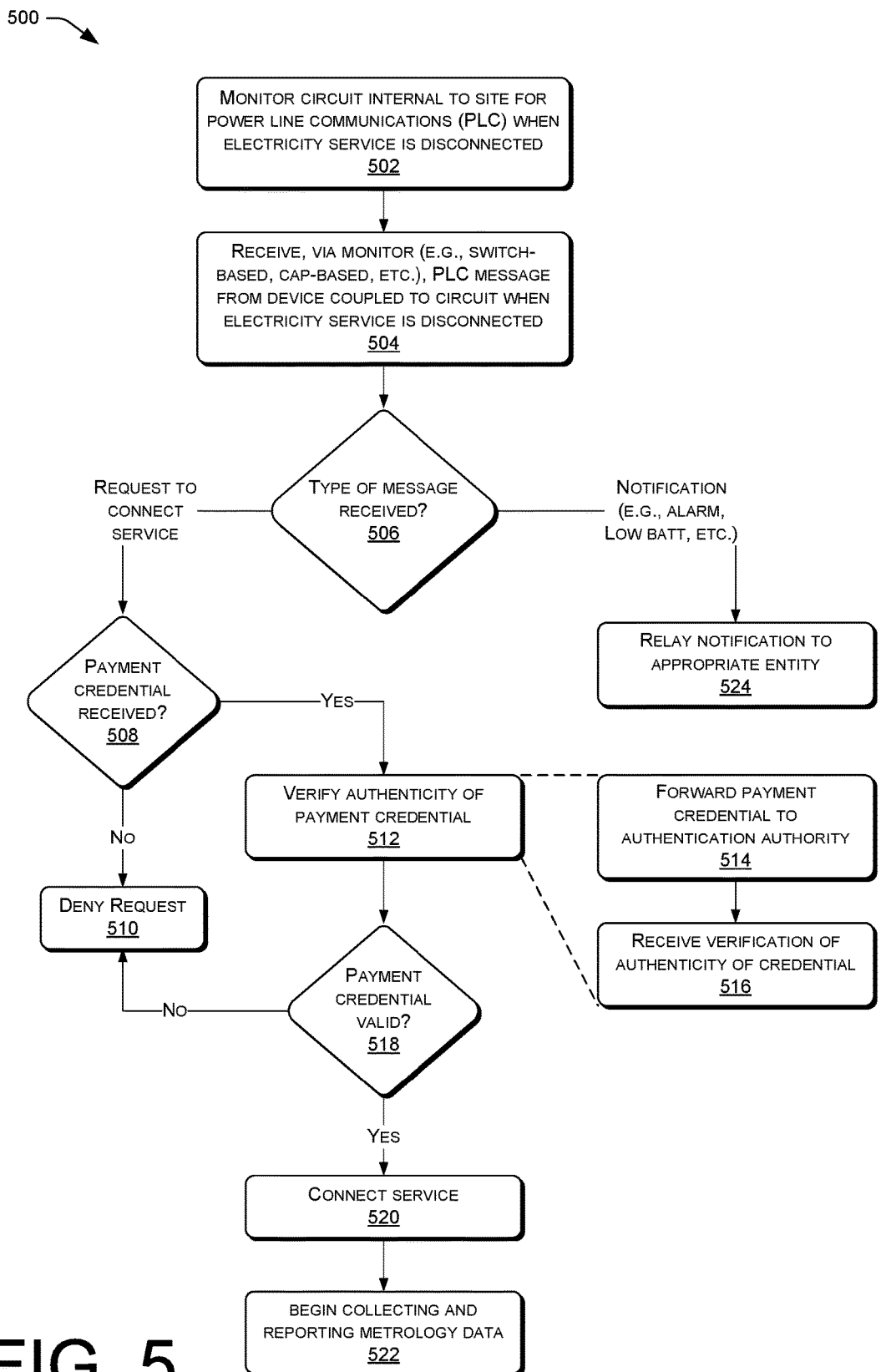
FIG. 5 is a flowchart illustrating an example method of PLC communication between a network communication device, such as a meter, and an appliance on a circuit internal to a site even when electricity service to the site is disconnected.

FIG. 5 illustrates an example method 500 of PLC communication between a network communication device, such as network communication device 102(M), and an appliance, such as appliance 404(P), on a circuit internal to a site even when electricity service to the site is disconnected. The method 500 is described with reference to the example architecture 100, network communication devices 102, and appliances 404, of FIGS. 1-4 for convenience. However, the method 500 is not so limited, may be implemented using other architectures and devices. Moreover, the example architecture 100, network communication devices 102, and appliances 404, of FIGS. 1-4 may be used to implement numerous other methods.

According to method 500, at block 502, an electricity meter or network communication device, such as network communication device 102, monitors a circuit (e.g., circuit 400) internal to a site (e.g., 104) for PLC communications when electricity service to the site is disconnected. In some embodiments, the network communication device may employ a switch-based or capacitor-based monitor circuit, such as those described in FIGS. 3A-3D, to monitor the circuit when the electricity service is disconnected. At block 504, the network communication device receives a PLC message (e.g., via PLC coupler 210, PLC modem 216, and PLC logic 214) from a device (e.g., appliance 404) coupled to the circuit internal to the site when the site is disconnected from electricity service.

At block 506, the network communication device (or another device on the network) may determine what type of message was received. In one example, the PLC message may comprise a request from an appliance to connect electricity service to the site. In other examples, the PLC message may comprise a notification about a potentially hazardous condition at the site, such an alarm from a smoke detector, security system, moisture detector, carbon monoxide detector, seismic detector, temperature sensor, radon detector, or other sensor or device. In still other examples, the message may comprise a notification of a status or condition (e.g., low battery) of the appliance or another device on the circuit.

If, at block 506, the network communication device determines that the PLC message is a request to connect or reconnect service to the site (e.g., a request from an onsite terminal at the site), in some embodiments, the network communication device may simply connect service to the site responsive to receiving the request. However, in the illustrated embodiment, at block 508, the network communication device determines whether or not a payment credential was received with the message, or was previously received or stored. If no payment was received (NO at block 508), the network communication device denies the request, in which case a denial message may be sent to the appliance or the request may simply be ignored. If a payment credential has been received (YES at block 508) with the message or in the past, the network communication device may, at block 512, verify the authenticity of the payment credential. The payment credential may be verified by, at block 514 forwarding (e.g., using communication module 112) the credential to an authentication authority and, at block 516, receiving a verification of the authenticity of the payment credential. At block 518, the network communication device determines whether the payment credential was authentic. If the credential is not authentic (NO at block 518), the network communication device denies the request, in which case a denial message may be sent to the appliance or the request may simply be ignored. At block 520, responsive to receiving the request including an authentic payment credential, the network communication device may proceed to connect electricity (or other utility resource) service to the site.

After connecting electricity service to the site, at block 522, the network communication device may begin collecting metrology data (e.g., using metrology 116) indicating consumption of electricity by the site, and may report the metrology data to a central office of a provider of the electricity service.

Referring back to block 506, if the message is determined to be a notification of a potentially unsafe condition or a status notification (e.g., low battery warning), the network communication device may, at block 524, relay the notification to an appropriate entity (e.g., central office, another device on the utility communication network, maintenance personnel, emergency service personnel, etc.) based on one or more predetermined routing algorithms, instructions in the PLC notification message itself, or based on one or more other criteria. The notification may be relayed by a communication module of the network communication device.

The method 500 is illustrated as collections of blocks and/or arrows in logical flowcharts representing a sequence of operations that can be implemented in hardware, software, firmware, or a combination thereof. The order in which the blocks are described is not intended to be construed as a limitation, and any number of the described operations can be combined in any order to implement the method, or alternate methods. Additionally, individual operations may be omitted from the method without departing from the spirit and scope of the subject matter described herein. In the context of software, the blocks represent computer instructions stored in memory or computer-readable media that, when executed by one or more processors, perform the recited operations. In the context of hardware, the blocks may represent one or more circuits (e.g., application specific integrated circuits—ASICS) configured to execute the recited operations.

CONCLUSION

Although the application describes embodiments having specific structural features and/or methodological acts, it is to be understood that the claims are not necessarily limited to the specific features or acts described. Rather, the specific features and acts are merely illustrative of some embodiments that fall within the scope of the claims of the application.

What is claimed is:

1. A method performed by an electricity meter comprising a network communication device, a switch, a service switch and a leakage capacitor, the method comprising:

opening the service switch to disconnect an electricity service provided by a service provider to a site, metered by the electricity meter, by opening a circuit used to provide the electricity service to the site;
setting the switch to a first position;
receiving a power line communication passing through the leakage capacitor sent from a device internal to the site, wherein a first lead of the leakage capacitor is connected through the switch when set in the first position to a first terminal of the service switch that is internal to the site, and a second lead of the leakage capacitor is connected through a power line communication coupler to a neutral conductor, and wherein the leakage capacitor leaks current past the service switch when the switch is in the first position;
setting the switch to a second position; and
sending a second power line communication from a power line communication device connected to the power line communication coupler, wherein the first lead of the leakage capacitor is connected through the switch, when set in the second position, to a second terminal of the service switch that is external to the site.

2. The method of claim 1, wherein the power line communication comprises a request from an appliance to connect the electricity service to the site.

3. The method of claim 2, further comprising connecting the electricity service to the site responsive to receiving the request from the appliance to connect electricity service.

4. The method of claim 3, further comprising, after connecting electricity service to the site:
collecting metrology data indicating consumption of electricity by the site; and
reporting the metrology data to a central office of the service provider of the electricity service.

5. The method of claim 2, wherein the appliance comprises an onsite terminal accessible to a person at the site.

6. The method of claim 1, wherein the power line communication comprises a notification about a potentially hazardous condition at the site.

7. The method of claim 6, wherein the notification comprises an alarm from a smoke detector, an alarm from a security system, an alarm from a moisture detector, an alarm from a carbon monoxide detector, an alarm from a seismic detector, an alarm from a temperature sensor, or an alarm from a radon detector.

8. The method of claim 1, wherein the received power line communication comprises a low battery notification.

9. A network communication device comprising:
one or more processors;
a service switch to selectively connect or disconnect electricity service from a service provider to a site, the service switch comprising a first end connected directly to a downstream node connected to the site and a second end connected directly to an upstream node connected to the electricity service;
a leakage capacitor having a first lead connected through a power line communication coupler to a neutral conductor; a power line communication device connected to the power line communication coupler;
a switch having a first side connected to a second lead of the leakage capacitor and a second side that in a first position is connected to a downstream terminal of the service switch within the site, and that in a second position is connected to an upstream terminal of the service switch external to the site; and
memory storing logic that, when executed by the one or more processors, causes the one or more processors to:
determine that the service switch has opened to create an open circuit that disconnects the electricity service from the site;
receive a power line communication passing through the leakage capacitor, wherein the receiving is performed while the switch is in the first position, to receive the power line communication through the leakage capacitor; and
send a power line communication from the power line communication device, wherein the sending is performed while the switch is in the second position.

10. The network communication device of claim 9, wherein the network communication device comprises an electricity meter and includes metrology to measure electricity usage at the site.

11. The network communication device of claim 9, further comprising a communication module to send and receive communications via a utility communication network.

12. The method of claim 1, wherein the leakage capacitor is in parallel with the service switch.

13. A network communication device comprising:
one or more processors;
a service switch to selectively connect or disconnect electricity service from a service provider to a site, the service switch comprising a first end connected directly to a downstream node connected to the site and a second end connected directly to an upstream node connected to the electricity service, wherein the service switch creates an open circuit between the site and the upstream node when opened to disconnect the electricity service;
one or more leakage capacitors, at least one of the one or more leakage capacitors having a first lead connected through a power line communication coupler to a neutral conductor;
a power line communication device connected to the power line communication coupler;
a switch having a first side connected to a second lead of the leakage capacitor and a second side that in a first position is connected to a downstream terminal of the service switch within the site, and that in a second position is connected to an upstream terminal of the service switch external to the site; and
memory storing logic that, when executed by the one or more processors, causes the one or more processors to:
determine that the service switch has opened to disconnect the electricity service from the site;
receive a power line communication while the switch is in the first position, to receive the power line communication through the leakage capacitor; and
send a power line communication from the power line communication device while the switch is in the second position.

14. The network communication device of claim 13, further comprising a communication module communicatively coupled to the one or more processors to send and receive communications via a utility communication network.

15. The network communication device of claim 13, further comprising a high frequency transformer in series with a high voltage capacitor, wherein the high frequency transformer and high voltage capacitor are electrically connected to the second lead of the one or more leakage capacitors.

16. The network communication device of claim 15, wherein a first end of the high voltage capacitor is connected to the upstream node connected to the electricity service.

17. The network communication device of claim 13, wherein the network communication device comprises an electricity meter and includes metrology to measure electricity usage at the site.

18. The network communication device of claim 13, wherein receiving the power line communication comprises receiving a request from an appliance to connect electricity service to the site.

* * * * *